March 24, 1936. A. S. RAMAGE 2,035,189
PROCESS FOR THE VAPOR PhASE TREATMENT OF UNSATURATED HYDROCARBONS
Filed Aug. 29, 1932
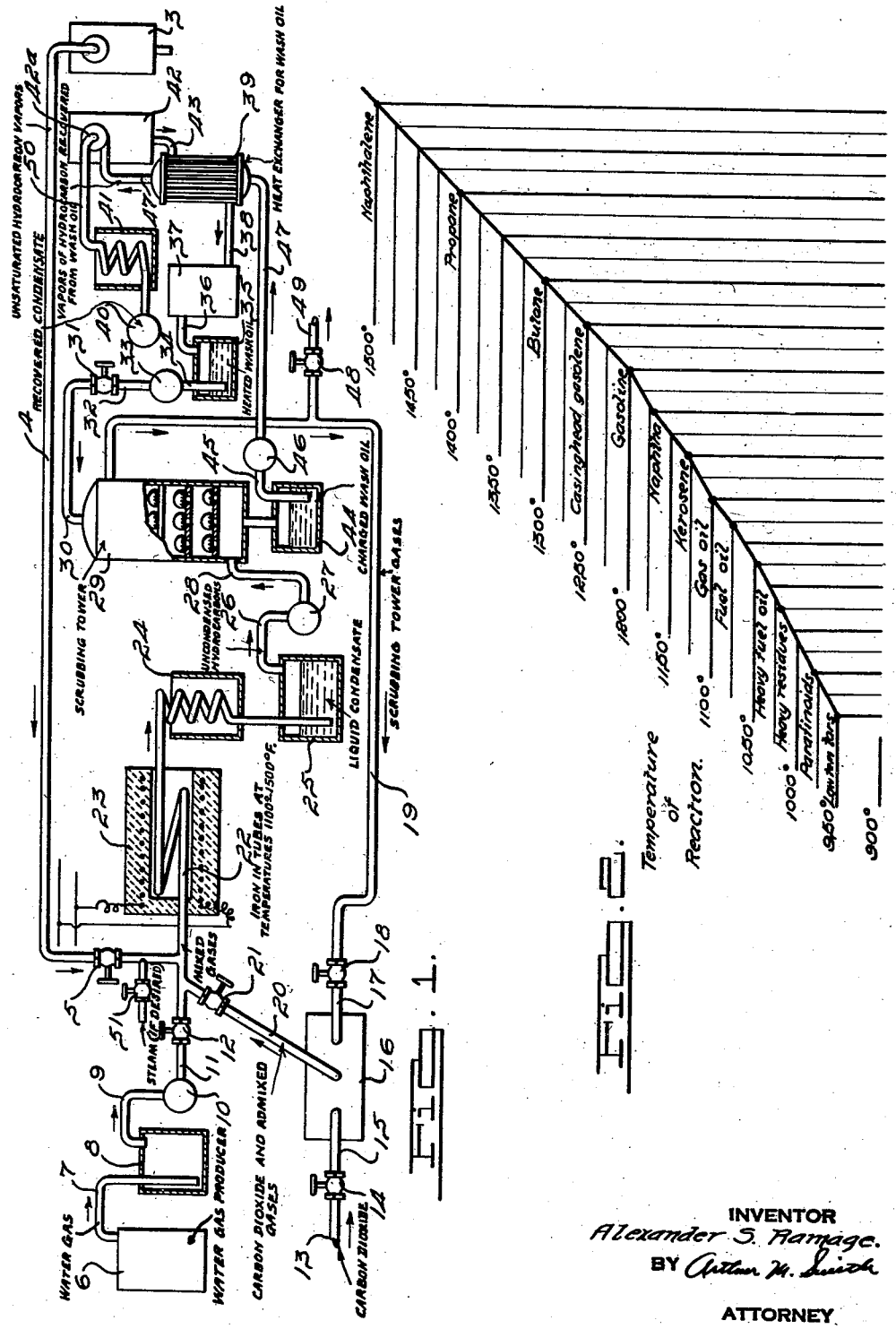
INVENTOR
Alexander S. Ramage.
BY
ATTORNEY Patented Mar. 24, 1936

2,035,189

UNITED STATES PATENT OFFICE 2,035,189

PROCESS FOR THE VAPOR PHASE TREATMENT OF UNSATURATED HYDROCARBONS

Alexander S. Ramage, Detroit, Mich., assignor to Merlin Wiley and Ora L. Smith, trustees, Detroit, Mich.

Application August 29, 1932, Serial No. 630,877

5 Claims. (Cl. 260—156)

My invention relates to a new and useful process for the vapor phase treatment of unsaturated hydrocarbons and particularly to such a process adapted to produce hydrocarbon products having differing characteristics than the material treated.

As an example of products which may be obtained by the use of a process embodying my invention, I have produced hydrocarbon mixtures composed principally of alcohols and aromatics with other hydrocarbons in differing proportions, the said mixture having an octane rating which varies from 110 to 138 and an aniline point which varies from zero degrees Fahrenheit to 15 degrees below zero Fahrenheit. Such mixtures may be used for various useful purposes as, for example, a motor fuel spirit or a solvent or extender for paints, lacquers, or the like.

In order better to explain my invention, certain terms will be used throughout the specification which I here define as follows:

*Dehydrogenation.*—By this term is meant an action in which hydrogen atoms are split off the material treated, producing a product relatively poorer in hydrogen than the material treated.

*Oxidation.*—By this term is meant an action in which oxygen is added to the product treated.

*Hydrogenation.*—By this term is meant an action in which hydrogen is added to the product treated.

*Unsaturated hydrocarbon.*—As here used, this term includes vapors of all the unsaturated hydrocarbons either of a single group or of a mixture of several groups having the general formulas $C_nH_{2n}$, $C_nH_{2n-2}$, $C_nH_{2n-4}$.

*Aromatics.*—As here used, this term relates to a hydrocarbon mixture composed principally of hydrocarbons having the general formula of $C_nH_{2n-6}$ and including particularly benzol, toluol, xylol, mesitylene and cumene, with the addition of some naphthenes and olefins in the mixture.

A process embodying my invention uses as a starting material the vapors of unsaturated hydrocarbon products included in the term "olefinic vapors". To such vapors varying amounts of carbon dioxide, carbon monoxide, hydrogen and water are added.

In order to facilitate a more ready understanding of the process embodying my invention, I have shown in Fig. 1 of the accompanying drawing a schematic drawing of an apparatus which may be used in a plant designed to operate on a process embodying my invention. In Fig. 2 of the accompanying drawing, I have shown a chart of various temperatures to be used in carrying out the reactions indicated.

Description of apparatus

Referring to Fig. 1, 3 designates a still which contains the starting material. The vapors from this material flow from the still 3 through a conduit 4 leading to a metering valve 5. In case it is desired to add steam to these vapors, it may be admitted through the metering valve 51. A water gas producer 6 is connected with a conduit 7 terminating in a gas reservoir 8. A conduit 9 connects the gas reservoir 8 with a compressor 10, from which a conduit 11 leads to a metering valve 12. A conduit 13 leads from a source of carbon dioxide under pressure and leads to a metering valve 14. A conduit 15 leads from the metering valve 14 to a pressure reservoir 16. A conduit 17 extends into the pressure reservoir 16 from a metering valve 18, which is connected with a conduit 19. A conduit 20 leads from the pressure reservoir 16 to a metering valve 21.

Tubes 22 terminate in a conduit portion which connects with each of the metering valves 5, 12 and 21, and permits the passing of gases from each of said valves to the interior of the tubes 22. The tubes 22 are heated by a furnace such as the electric furnace 23 here shown, which is supplied with electrical energy through feeding wires electrically connected with a source of electrical energy (not shown).

The tubes 22 extend through a condenser 24 to a chamber 25 wherein the liquid condensate is separated from the gaseous portion of the vapors. Vapors from the chamber 25 pass through a conduit 26 communicating with a compressor 27. The compressor 27 drives the gases through the conduit 28 to a scrubbing tower 29. Wash oil is introduced into the scrubbing tower 29 through a conduit 30, which extends through the top thereof.

The conduit 30 is operatively connected with a valve 31, which is connected with a conduit 32 leading to the wash oil pump 33. The wash oil pump 33 is connected with a conduit 34 leading from a wash oil reservoir 35. Charged wash oil from the tower 29 issues from the bottom of the tower 29 to the tank 44, thence to conduit 45 to pump 46, thence by conduit 47 through heat exchanger 39, and thence to the middle of fractionating tower 42a of wash oil still 42. The vapors from the still 42 pass from the top of the fractionating tower 42a by conduit 50 through condenser 41 to storage tank 40. The distilled wash oil in still 42 continuously leaves by conduit 43 in counter current through heat exchanger 39, thence through conduit 38 to cooler 55

37, thence through conduit 36 to wash oil storage tank 35.

The conduit 19 connects with the scrubbing tower 29 and permits the drawing off of the scrubbed gases which pass through the tower 29 and through the metering valve 18 to the conduit 17 and to the pressure reservoir 16 for mixing with the carbon dioxide introduced therein when it is desired to recycle the gases through the process. If it is not desired to recycle the gases through the process, or if at any time a surplus of gas is present in the process, the gases may be withdrawn from the conduit 19 through a metering valve 48. If it is not desired to recycle any of these gases in the process, the metering valve 18 is closed and the metering valve 48 is opened, and the gases pass through the conduit 49, which may lead to any desired point.

The operation of my process through the apparatus heretofore described is substantially as follows: Vapors of the starting material pass from the still 3 through the conduit 4 and through the metering valve 5 at a predetermined and controlled rate and pass into the conduit attached to the tubes 22. At the same time water gas is produced in the water gas producer 6 and passes through the gas reservoir 8 and the compressor 10 to the metering valve 12, through which it is permitted to pass into the conduit of the tubes 22 at a predetermined rate. At the same time, carbon dioxide is metered into the reservoir 16 through the metering valve 14, and if desired, is there mixed with the gases coming from the scrubbing tower 29 which are metered through the valve 18 at a predetermined rate, or may be used without the mixture of the other gases.

The intermixed carbon dioxide and recycled gases or the pure carbon dioxide then pass through the conduit 20 and through the metering valve 21 to the conduit attached to the tubes 22. The rate of flow of the carbon dioxide or mixture of carbon dioxide and scrubbed gas to be recycled is controlled by the metering valve 21.

Thus the mixture of gases introduced into the tubes 22 is definitely controlled through the metering valves 5, 12, 14, 18 and 21. The gases are thus mixed in definite proportions in the tubes 22. The tubes 22 contain steel wool, iron turnings, or finely divided reduced iron, which is heated to a predetermined temperature varying from 1100 degrees Fahrenheit to 1500 degrees Fahrenheit, depending upon the nature of the starting material. The rate of flow of gas through the tubes 22 likewise is regulated by the metering valves 5, 12 and 21 and the vapors created in the tubes 22 pass through the condenser 24. The liquid condensate passes into the reservoir 25 and the gaseous portion of the vapors is passed through the conduit 26 to the compressor 27, from which they are driven into the scrubbing tower 29. There the gases are washed with wash oil coming through the conduit 30. The wash oil being recycled through the heat exchanger 39 in order to heat the wash oil coming from the scrubbing towers, by the exchange of heat contained in the wash oil passing from the wash oil still 42. The washed gas which emerges from the scrubbing tower 29 passes through the conduit 19 and may be used to recycle with the carbon dioxide as heretofore explained, or may be drawn off from the process through the valve 48.

Starting material

As a starting material for a process embodying my invention, I propose to use the vapors of unsaturated hydrocarbons as heretofore defined. Such material may be prepared in any desired manner. For practical purposes I prefer to prepare the material either by the process of my United States Patent No. 1,224,787, in which saturated hydrocarbons are passed over red hot ferric oxide without the addition of steam, or by the process of the Strache and Porges United States Patent No. 1,205,578, in which the saturated hydrocarbons plus steam are passed over red hot ferric oxide.

A process embodying my invention is not limited, however, to the use of the starting material produced by either of these processes, but may also be used successfully with unsaturated vapors produced by other methods, such for example as the treatment of alcohols with sulphuric or phosphoric acid, or by heating the alkyl halogen compounds, such as the chlorides, bromides, or iodides, with alcoholic potash, or by the electrolysis of the alkali salts of dibasic acids.

If the unsaturated hydrocarbon vapors are produced by any of the three last named methods it will be found that the vapors are dry vapors and do not have a sufficient quantity of moisture present to carry out the indicated reactions. If, therefore, such vapors are used, or if the vapors produced by other methods are deficient in the amount of moisture contained therein, sufficient water in the form of steam should be added through metering valve 51 to the vapors of the starting material to carry out fully the hereinafter indicated reactions.

The amount of water required may be calculated by those skilled in the art. The nature of the vapor and the method used for producing it must be considered carefully in such calculations. For example, if the vapors are produced by the method of my United States Patent No. 1,224,787, or by the method of the Strache and Porges United States Patent No. 1,205,578, it will be found that the reactions forming the vapors from a hydrocarbon of the paraffin series will produce by dehydrogenation one molecule of water for each molecule of olefin formed. This amount of water is present in the vapor in the form of steam and must be considered in any computation as to the amount of water required in a process embodying my present invention when such vapors are used as the starting material.

In producing unsaturated hydrocarbon vapors by the process of my United States Patent No. 1,224,787, I have found that the quantity of water present per one hundred gallons of oil treated also varies with the material employed as the starting material. Examples of this variation may be seen in the following chart:

| Starting material | Produced material | Specific gravity | Gallons of water per 100 gallons of oil |
|---|---|---|---|
| $C_{16}H_{34}$ | $C_{16}H_{32}$ | .818 | 6.72 |
| $C_{14}H_{30}$ | $C_{14}H_{28}$ | .770 | 7.06 |
| $C_{12}H_{26}$ | $C_{12}H_{24}$ | .760 | 8.09 |
| $C_7H_{16}$ | $C_7H_{14}$ | .688 | 12.41 |
| $C_6H_{14}$ | $C_6H_{12}$ | .663 | 15.58 |

In calculating the amount of water required it must be noted also that in practice about 70% only of the hydrocarbon reacts and about 30% of the hydrocarbon becomes converted to gases. Therefore, the amount of water required must be calculated on the basis of this 70% which reacts instead of the 100% of which 30% is converted to a gas. For this reason it is considered preferable to calculate the amount required on the basis of 150 gallons of oil instead of 100 gallons of oil in considering the amounts of the gases produced. However, if the process is to be used for the production of the liquid condensate only, the gases formed can be recycled over and over again until a thorough reaction ensues. This, however, may not be entirely feasible from the commercial angle inasmuch as the values contained in the gases have been found to be greater than the value of the oil converted to the gas.

The vapors used as the starting material should be nearly or quite free from the presence of saturated hydrocarbons, because if such hydrocarbons are present in any considerable amounts, cracking will result in the tubes and the accompanying deposition of carbon will tend to plug up the exit tubes. In order, therefore, to insure the substantial absence of any such saturated hydrocarbons, I prefer to pass the vapors used over either ferric or cupric oxide, which may be heated to a suitable temperature, such as 900 degrees Fahrenheit.

*Description of process*

The chemical reactions which enter into a process embodying my invention may occur in any suitable apparatus known to those skilled in the art. In order, however, to aid in the detailed description of a process embodying my invention, reference will be made to the apparatus shown in the accompanying schematic drawing, which has heretofore been described in detail.

The vapors employed as the starting material are mixed with carbon dioxide only or mixtures of carbon dioxide and carbon monoxide, hydrogen and water in varying amounts, depending upon the starting materials and the resultant products desired.

In addition, desirable results also have resulted from the recycling of the gases formed during the process with the intermixed gases and olefinic vapors. The intermixed gases are passed into the entry end of the tubes 22, which are filled with steel wool, iron turnings, or finely divided reduced iron, the temperature of these tubes being preferably maintained at a temperature ranging from 1100 degrees Fahrenheit to 1500 degrees Fahrenheit. It is not practical to state any general definite temperatures, as the temperature must be closely regulated according to the nature of the vapor treated and the length of the tubes and the time of exposures to the reacting material.

In an embodiment of my invention which has been used successfully, I have found that if the tubes 22 are arranged in sets of three, with the lowest temperatures in the entry tube and the highest temperatures in the exit tube, and with 54 feet of tubing to be traversed by the gases, and with a flow of starting material through 3 inch tubes of 6 to 8 gallons per hour, the temperatures as shown in the chart Fig. 2 may be used advantageously.

The reactions involved are complicated and are not fully known, but are indicated in part at least in the following formulas which represent the actions occurring in the process embodying my invention when various kinds of starting materials are employed, to which are added different kinds of materials in varying amounts to give varying resultant products.

1. $2C_{16}H_{32} + 2CO_2 + 2H_2O = 2C_8H_{10} + 2C_8H_{17}OH + 2CH_3OH + 2H_2O$.
2. $2C_{14}H_{28} + 2CO_2 + 2H_2O = 2C_7H_8 + 2C_7H_{15}OH + 2CH_3OH + 2H_2O$.
3. $2C_{12}H_{24} + 2CO_2 + 2H_2O = 2C_6H_6 + 2C_6H_{13}OH + 2CH_3OH + 2H_2O$.
4. $3C_2H_4 + 8CO_2 + 5C_{12}H_{24} + 8H_2O = 8C_6H_6 + 2C_6H_{13}OH + 14CH_3OH + 8H_2O$.
5. $2C_2H_4 + 4CO_2 + 2C_{12}H_{24} + 4H_2O = 4C_6H_6 + 8CH_3OH + 4H_2O$.
6. $3C_2H_4 + 6CO_2 + (6CO + 6H_2) + 8H_2O = 8C_6H_6 + 18CH_3OH + 8H_2O$. (water gas)
7. $(12C_2H_4 + 4C_3H_6 + 2C_4H_8) + 34CO_2 + 17C_{12}H_{24} + 34H_2O = 34C_6H_6 + 58CH_3OH + 10C_2H_5OH + 34H_2O$.

In all these reactions it will be clearly noticed that the amount of water used is always found practically the same as that contained in the product and which can be separated and measured. However, this same water has undergone many changes, the water primarily used being decomposed by the metallic iron into nascent or active hydrogen, and oxide of iron.

This oxide of iron immediately dehydrogenates the olefin to the lower content of hydrogen liberating water, and forming metallic iron. These again combine to oxide and nascent hydrogen, and the oxide again dehydrogenates the unsaturated hydrocarbon until $C_nH_{2n-6}$ is formed.

So that the water at first used is consumed and its place is made up by the water formed by dehydrogenation.

The products resulting from the reactions indicated in the above formulas are, in my opinion, produced as a result of three distinct reactions which occur simultaneously under the conditions stated. These reactions are as follows:

(1) Oxidation, resulting from the use of carbon dioxide. It is known that carbon dioxide in the presence of metallic iron gives up to one atom of oxygen, leaving carbon monoxide. This reaction starts at about 600 degrees Fahrenheit and is complete at 1100 degrees Fahrenheit. This may be expressed by way of example by the following formula: $C_2H_4 + 2CO_2 = 2CH_2O + 2CO$.

(2) Hydrogenation, resulting from the presence of nascent or active hydrogen in the reaction. Probably this hydrogen results from the reaction between the water present and the metallic iron, in accordance with formula $$Fe + H_2O = FeO + H_2.$$

The hydrogen resulting from the reaction is in the nascent or active state and immediately combines with the aldehyde resulting from the oxidation of the hydrocarbon, and forms alcohol, probably in accordance with the following formula:

$$2CH_2O + 2H_2 = 2CH_3OH.$$

At the same time other nascent or active hydrogen present in the reaction, reacts with the carbon monoxide produced during the oxidation to form further aldehydes, probably in accordance with the following formula: $2CO + 2H_2 = 2CH_2O$. The aldehyde thus formed being subjected to further simultaneous hydrogenation to form further alcohol, probably in accordance with the following formula: $2CH_2O + 2H_2 = 2CH_3OH$.

(3) Dehydrogenation of the olefinic vapors to a hydrocarbon of lesser hydrogen content than the starting material due to the reduction of the oxide of iron to metallic iron with the formation of water, which reacts with the heated metallic iron to liberate nascent hydrogen used as the hydrogenating material. This reaction is probably expressed by the following formulas:

(a) $Fe + H_2O = FeO + H_2$.
(b) $C_6H_{12}(C_nH_{2n}) + FeO = C_6H_{10}(C_nH_{2n-2}) + Fe + H_2O$.
(c) $Fe + H_2O = FeO + H_2$.
(d) $C_6H_{10}(C_nH_{2n-2}) + FeO = C_6H_8(C_nH_{2n-4}) + Fe + H_2O$.
(e) $Fe + H_2O = FeO + H_2$.
(f) $C_6H_8(C_nH_{2n-4}) + FeO = C_6H_6(C_nH_{2n-6}) + Fe + H_2O$.

It is to be observed that in the dehydrogenation of the hydrocarbon having the general formula $C_nH_{2n}$ to a hydrocarbon having the general formula of $C_nH_{2n-6}$, as above set forth, in reactions expressed by the formulas (a), (c) and (e), three molecules of nascent or active hydrogen are liberated and are available for use as the hydrogenating material as above described. It is to be observed, however, that to complete the hydrogenation heretofore described, six molecules of hydrogen are required.

It is necessary, therefore, to complete the entire hydrogenation above outlined, that two molecules of any olefin employed be dehydrogenated to the aromatic in accordance with the above stated formulas, which will produce six molecules of nascent or active hydrogen.

A process embodying my invention may be carried on at substantially atmospheric pressures. All of the above stated reactions have been found to occur satisfactorily without the use of pressures substantially above atmospheric pressure.

The foregoing reactions are found to take place in the tubes and should be completed by the time that the vapors emerge from the exit end of the final tube, if the process is properly regulated.

The vapors, after passing through the tubes, are finally cooled, condensed, and the condensate separated from the condensed water. This condensed water must be distilled to separate the water soluble alcohols which after rectification can be added to the separated condensate. The gas is then scrubbed in any well known apparatus to extract the aromatic and higher olefins, or the gas can be compressed, cooled and expanded, doing external work, to liquefy the ethylene, propylene and butylene, the balance of the gas remaining being pure methane.

*Products produced from the process*

The liquid condensate which may be produced by a process embodying my invention will be found to vary in variety and characteristics, according to the specific products and treatment thereof which are subjected to the process used as an embodiment of my invention.

One product which may be produced by such a process consists principally of alcohols up to butyl alcohol, particularly methyl, ethyl and propyl alcohols and aromatics, with small quantities of naphthenes and undecomposed olefins present in the liquid condensate. Such a product, on distillation to a 450 degrees Fahrenheit end point, has been found to have a specific gravity of .865, an octane number of 130, and an aniline point of 10 degrees below zero Fahrenheit.

Theoretically, only aromatics such as the benzol family should be present in the liquid condensate, but in practice it has been found impossible to avoid some hydrogenation of some of the benzol with the formation of small quantities of cyclo products, such as cyclohexane.

Variations in processes embodying my invention using different types of starting materials and subjecting such materials to different treatments as indicated in the foregoing formulas Nos. 1 to 7, inclusive, produce variations in the product resulting therefrom. The variations in the materials used and the liquids produced as a result of the reactions indicated by the said formulas will be seen by a consideration of the following compilation showing materials used and the characteristics of the liquid produced by the reactions indicated in each of said formulas.

| Formula Number | Material used | Amount | Liquid produced | Amount |
|---|---|---|---|---|
| 1 | Olefin oil ($C_{15}H_{32}$) | 100 gals | Aromatics | 38% |
|  | Carbonic acid | 126 lbs | Octyl alcohol | 49% |
|  | or |  |  |  |
|  | Carbon dioxide | 1027 cu. ft | Methyl alcohol | 13% |
|  | Water required | 6.72 gals | Octane number | 79 |
|  | Water produced | 6.72 gals |  |  |
| 2 | Olefin oil ($C_{14}H_{28}$) | 100 gals | Aromatics | 40% |
|  | Carbonic acid | 149 lbs | Heptyl alcohol | 52% |
|  | or |  |  |  |
|  | Carbon dioxide | 1214 cu. ft | Methyl alcohol | 8% |
|  | Water required | 7.06 gals | Octane number | 85.5 |
|  | Water produced | 7.06 gals |  |  |
| 3 | Olefin oil ($C_{12}H_{24}$) | 100 gals | Aromatics | 35% |
|  | Carbonic acid | 163 lbs | Hexyl alcohol | 49% |
|  | or |  |  |  |
|  | Carbon dioxide | 1328 cu. ft | Methyl alcohol | 16% |
|  | Water required | 8.09 gals | Octane number | 105 |
|  | Water produced | 8.09 gals |  |  |
| 4 | Olefin oil ($C_{12}H_{24}$) | 100 gals | Aromatics | 47% |
|  | Carbonic acid | 265 lbs | Hexyl alcohol | 37% |
|  | or |  |  |  |
|  | Carbon dioxide | 2127 cu. ft | Methyl alcohol | 16% |
|  | Ethylene 62.2 lbs | 800 cu. ft | Octane number | 107.5 |
|  | Water required | 12.83 gals |  |  |
|  | Water produced | 8.09 gals |  |  |
|  | Water to be added | 4.74 gals |  |  |
| 5 | Olefin oil ($C_{12}H_{24}$) | 100 gals | Aromatics | 53% |
|  | Carbonic acid | 332 lbs | Methyl alcohol | 47% |
|  | or |  |  |  |
|  | Carbon dioxide | 2657 cu. ft | Octane number | 136 |
|  | Ethylene 105 lbs | 1333 cu. ft |  |  |
|  | Water required | 16.03 gals |  |  |
|  | Water produced | 8.09 gals |  |  |
|  | Water to be added | 7.94 gals |  |  |

| Formula Number | Material used | Amount | Liquid produced | Amount |
|---|---|---|---|---|
| 6 | Olefin oil ($C_{12}H_{24}$) | 100 gals | Aromatics | 49% |
| | Carbonic acid | 248 lbs | Methyl alcohol | 51% |
| | or | | | |
| | Carbon dioxide | 1990 cu. ft | Octane number | 138 |
| | Ethylene 79 lbs | 1000 cu ft | | |
| | Water gas 167 lbs | 5840 cu. ft | | |
| | Water required | 16.04 gals | | |
| | Water produced | 8.09 gals | | |
| | Water to be added | 7.95 gals | | |
| 7 | Olefin oil ($C_{12}H_{24}$) | 100 gals | Aromatics | 51% |
| | Carbonic acid | 332 lbs | Ethyl alcohol | 10% |
| | or | | | |
| | Carbon dioxide | 2657 cu. ft | Methyl alcohol | 39% |
| | Ethylene 74.6 lbs | 938 cu. ft | Octane number | 137 |
| | Propylene 37.3 lbs | 318 cu. ft | | |
| | Butylene 24.8 lbs | 158 cu. ft | | |
| | Water required | 16.04 gals | | |
| | Water produced | 8.09 gals | | |
| | Water to be added | 7.95 gals | | |

Of the foregoing processes embodying my invention, those expressed by the formulas numbered 4, 5, 6, and 7 appear to me to be the most practical from the economic standpoint. Assuming that these processes are carried out in tubes heated by an electric furnace similar to that shown in the drawing, and in which a part of the electric current consumed is produced by the utilization of the methane produced in the process, the following table shows the required materails which must be added to carry out the process, and gives a list of the materials produced which may be sold or used.

The gases produced by processes embodying my invention have an approximate average analysis as follows:

|  | Per cent |
|---|---|
| Ethylene | 35 |
| Propylene | 10 |
| Butylene | 5 |
| Methane | 50 |

It is to be noted that in the gases all of the carbon dioxide, carbon monoxide and hydrogen have been found to have disappeared in the reaction. If, however, an excess of hydrogen is liber-

| Formula Number | Required materials | Amount | Products for sale | Amount |
|---|---|---|---|---|
| 4 | Olefin oil ($C_{12}H_{24}$) | 150 gals | Liquid condensate | 136 gals. |
| | Water | 4.75 gals | Gas | 4400 cu. ft. |
| | | | Ethylene | 58 lbs. |
| | | | Isopropyl alcohol | 8 gals. |
| | | | Butyl alcohol | 5 gals. |
| | | | Methane | 2200 cu. ft. |
| 5 | Olefin oil ($C_{12}H_{24}$) | 150 gals | Liquid condensate | 152 gals. |
| | Carbon dioxide | 64 lbs | Gas | 4400 cu. ft. |
| | Water | 8 gals | Ethylene | 16 lbs. |
| | | | Isopropyl alcohol | 8 gals. |
| | | | Butyl alcohol | 5 gals. |
| | | | Methane | 2200 cu. ft. |
| 6 | Olefin oil ($C_{12}H_{24}$) | 150 gals | Liquid condensate | 161 gals. |
| | Water | 8 gals | Gas | 4400 cu. ft. |
| | Coal | 300 lbs | Ethylene | 42 lbs. |
| | | | Isopropyl alcohol | 8 gals. |
| | | | Butyl alcohol | 5 gals. |
| | | | Methane | 2200 cu. ft. |
| 7 | Olefin oil ($C_{12}H_{24}$) | 150 gals | Liquid condensate | 157 gals. |
| | Carbon dioxide | 64 lbs | Gas | 4400 cu. ft. |
| | Water | 8 gals | Ethylene | 45 lbs. |
| | | | Iso propyl alcohol | 2 gals. |
| | | | Butyl alcohol | 1.5 gals. |
| | | | Methane | 2200 cu. ft. |

The amount of liquid condensate produced from a process embodying my invention depends on the starting material used and has been found to vary from 60% to 70% of the oil treated. Computed on the basis of 100 gallons of oil, the gas produced in such process varies from 3500 cubic feet to 2600 cubic feet, depending on the percentage of liquid condensate produced in the process, according to whether more or less gas may be desired. The amount of gas may be regulated by the recycling of the gases formed and automatically liberating the amount of gas desired through the relief valve 48.

The liquid condensate may be used for many chemical purposes. Its high octane number characteristics make it valuable as a blending material to increase the octane rating of low octane gasolines. It also is valuable as a solvent and as an extender for lacquers and the like. It also has been found to possess valuable properties as a cleaning fluid.

ated in order to insure complete hydrogenation of the products formed, some small trace of hydrogen may be present in the gases. These gases may be utilized in any desired manner known to those skilled in the art. For example, the ethylene may be removed and used in the usual manner to produce ethyl alcohol, ethylene glycol, ethylene dichloride, chlorethylene, etc. The propylene and butylene may be used for the production of alcohols, and the methane may be used in a gas engine to produce electric current consumed in the process.

The products produced from the gases may be mixed with the liquid condensate, the alcohols when it is to be used as a motor spirit for blending with low octane gasolines, and the chlorides when the product is to be used as a solvent.

*Regulation of the process*

A process embodying my invention may be controlled by a series of tests which will indicate whether the process is functioning properly and will indicate the necessary regulation of the process to produce the desired product.

The liquid condensate from the condensers should have a specific gravity varying from 32 to 35 degrees Baumé, with an end point of 450 degrees Fahrenheit. All fractions of the stream should be miscible or soluble in denatured alcohol in all proportions. If the specific gravity should be found to run over 35 degrees Baumé, the temperature of the tubes is increased until the specific gravity of the stream drops below 35 degrees Baumé. Likewise, if the specific gravity is below 32 degrees Baumé, the temperature of the tubes is lowered until the specific gravity of the stream is restored above 32 degrees Baumé.

The gases issuing from the condensers should be practically free from carbon dioxide, hydrogen and carbon monoxide, and should contain among other gases from 35% to 45% of ethylene and 50% of methane.

The unsaturated hydrocarbon vapors are metered into the tubes, as heretofore described, by the use of a constant pressure on the vapors and a restricting entering orifice. Substantially the same method is used to meter the several other gases used in the process. Thus all of the gases and vapors entering into the process are metered into the tubes. If, therefore, an analysis of the issuing gases should disclose appreciable quantities of hydrogen, carbon monoxide or carbon dioxide, the velocity of the gas through the tube should be lowered and the gas recycled.

A definite control over the process can thus be exercised by testing it as follows:

1. That every fraction cut from the stream is soluble in all proportions in denatured alcohol.
2. That the specific gravity of the stream shall not be less than 32 degrees Baumé, nor more than 35 degrees Baumé.
3. That the analysis of the issuing gases from the condenser, after scrubbing with oil, shall show practically no hydrogen, carbon monoxide or carbon dioxide, and shall contain from 35% to 45% of ethylene.

Hydrogenation of aldehydes

If the liquid condensate is to be used for its high octane characteristics, it is absolutely essential that all of the aldehydes formed in the oxidation of the hydrocarbon be completely hydrogenated during the process. It has been found that the octane ratings of the aldehydes are very low, even extending to negative ratings. For example, the octane rating of acetaldehyde is 30.8, and as the carbon atom in the aldehyde increases, the octane rating decreases, until in heptyl aldehyde the octane rating has been found to be a −72.7. It is apparent, therefore, that the presence of even small quantities of the aldehydes affects the octane rating of the liquid condensate in an adverse manner.

If, however, the hydrogenation of the aldehydes to alcohols is complete, a liquid having high octane characteristics will result. A study of the octane characteristics of the alcohols reveals the following octane ratings:

$CH_3OH$ _____ Octane number 172.
$C_2H_5OH$ _____ Octane number 171.
$C_3H_7OH$ _____ Octane number 141.
$C_4H_9OH$ _____ Octane number 120.
$C_5H_{11}OH$ _____ Octane number 115.
$C_6H_{13}OH$ _____ Octane number 85.
$C_7H_{15}OH$ _____ Octane number 56.
$C_8H_{17}OH$ _____ Octane number 32.

It is thus apparent that the high octane characteristics of the liquid condensate must depend upon the presence of a high percentage of the lower alcohols, particularly the methyl, ethyl and propyl alcohols, and less of the higher alcohols such as hexyl and heptyl having the octane rating of 85 and 56 respectively.

If the hydrogenation of the aldehydes is complete, it will be found that the aldehydes are practically all converted into alcohols, and also that no ketones are formed.

Reactions in the tubes

As heretofore pointed out in connection with the description of a process embodying my invention, the reactive material in the tubes is steel wool, iron turnings, or finely divided reduced iron. I believe that the metallic iron acts as a reacting material in the process, rather than as a catalyzer, and that the definite chemical reactions taking place in the tubes utilize the metallic iron as a definitely reacting material. In the normal use of the tubes in carrying out a process embodying my invention, it will be found that these reactions are so complete and so nearly balanced that the tubes will be found to be in substantially their original condition at all times. If, however, for any reason, the material in the tubes becomes oxidized or contaminated with impurities, it may be renewed by suitable treatment with reducing gases, or the material may be replaced with fresh material.

Summary

I am aware that heretofore there have been processes utilizing a restricted oxidation of a hydrocarbon for the purpose of forming oxidized fatty acids, and that as a result of such processes small amounts of alcohols and aldehydes were produced and were present in the resulting product. I also am aware that dehydrogenation of hydrocarbons has heretofore been carried out by the action of oxides of iron and steam on hydrocarbons. I believe, however, that no process has heretofore been proposed in which a definite product of predetermined characteristics is produced by the simultaneous oxidation, hydrogenation, and dehydrogenation of the hydrocarbon employed as a starting material, particularly where the oxidation results from the use of an inert oxidizing gas such as carbon dioxide.

From the foregoing it is apparent that a process embodying my invention consists of separate but simultaneously occurring reactions resulting in (1) The decomposition of water present in the reaction by the use of iron maintained at a red heat with the production of iron oxide and the liberation of active or nascent hydrogen.

(2) The dehydrogenation of the unsaturated hydrocarbon by the oxide of iron, with the formation of aromatics, water and metallic iron.

(3) Oxidation by the carbon dioxide acting on the unsaturated hydrocarbon, with the formation of aldehydes and carbon monoxide.

(4) Hydrogenation by the liberated active or nascent hydrogen acting on the aldehydes to form alcohols, on the carbon monoxide to form aldehydes, and on the aldehydes to form alcohols.

Processes embodying my invention may be varied in order that they may be utilized for the production of various products, some of which have been discussed in some detail in the present specification. I do not desire to be limited by the disclosure herein to any of the matters of detail therein stated, but desire to avail myself of all processes included within the scope of the accompanying claims.

I claim:

1. A process for the vapor phase treatment of unsaturated hydrocarbons which consists in introducing carbon dioxide in said hydrocarbon vapor and subjecting the resulting vapors to temperatures from 1000° to 1500° F. in the presence of metallic iron and steam, at substantially atmospheric pressures.

2. A process for the vapor phase treatment of olefinic hydrocarbons which consists in admixing steam and carbon dioxide gas with the vapors of olefinic hydrocarbons and subjecting the resultant admixture to temperatures of from about 1000° F. to about 1500° F. in the presence of metallic iron and steam at substantially atmospheric pressures to effect a dehydrogenation of said hydrocarbons in their vapor phase and to effect a substantially simultaneous oxidation of the resultant vapor to form aldehydes and oxidized hydrocarbon gases, and thereafter subjecting the aldehydes and other oxidized hydrocarbon gases to substantially simultaneous hydrogenation with nascent hydrogen liberated by the reactions effecting the dehydrogenation of the said vapors.

3. A process for the vapor phase treatment of olefinic hydrocarbons which consists in admixing carbon dioxide with said vapors and subjecting the resultant admixture to temperatures of from about 1000° F. to about 1500° F. in the presence of metallic iron and steam at substantially atmospheric pressures, thereby effecting a dehydrogenation of said hydrocarbons in their vapor phase and the substantially simultaneous oxidization of the resultant vapor with the formation of aldehydes and oxidized hydrocarbon gases, and subjecting the aldehydes and other oxidized hydrocarbon gases to substantially simultaneous hydrogenation by nascent or active hydrogen liberated during the dehydrogenation of the said vapors.

4. A process for the production of aromatics and alcohols from olefinic hydrocarbon gases and vapors at substantially atmospheric pressure, which consists in admixing carbon dioxide with said olefinic vapors and gases, and then subjecting the resultant admixture to temperatures from about 1000° F. to about 1500° F. in the presence of metallic iron.

5. A process for the vapor phase treatment of olefinic and other unsaturated hydrocarbons, which consists in the steps of providing a suitable quantity of an unsaturated hydrocarbon vapor containing a considerable quantity of olefinic gases and vapors, admixing carbon dioxide therewith, and thereafter subjecting the resultant admixture to contact with metallic iron maintained at temperatures of from about 1000° F. to about 1500° F. and at substantially atmospheric pressures.

ALEXANDER S. RAMAGE.